(12) United States Patent
Stuffel et al.

(10) Patent No.: US 11,547,210 B2
(45) Date of Patent: Jan. 10, 2023

(54) RETRACTION DEVICE AND METHOD FOR OPENING AND CLOSING A MOVABLE FURNITURE PART

(71) Applicant: Paul Hettich GmbH & Co. KG, Kirchlengern (DE)

(72) Inventors: Andreas Stuffel, Bueckeburg (DE); Marvin Buhmeier, Petershagen (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 362 days.

(21) Appl. No.: 16/755,197

(22) PCT Filed: Oct. 2, 2018

(86) PCT No.: PCT/EP2018/076765
§ 371 (c)(1),
(2) Date: Apr. 10, 2020

(87) PCT Pub. No.: WO2019/072636
PCT Pub. Date: Apr. 18, 2019

(65) Prior Publication Data
US 2021/0212461 A1    Jul. 15, 2021

(30) Foreign Application Priority Data
Oct. 11, 2017   (DE) ..................... 10 2017 123 613.9

(51) Int. Cl.
*A47B 88/467* (2017.01)
*E05F 1/16* (2006.01)
(Continued)

(52) U.S. Cl.
CPC ............. *A47B 88/467* (2017.01); *E05F 1/16* (2013.01); *F16H 19/04* (2013.01);
(Continued)

(58) Field of Classification Search
CPC ............... A47B 88/467; A47B 88/477; A47B 2088/4675; A47B 88/403; A47B 88/47;
(Continued)

(56) References Cited

U.S. PATENT DOCUMENTS 10,151,130 B2 * 12/2018 Wang ........................ E05F 1/16
10,513,876 B2 * 12/2019 Molloy ..................... E05F 1/16
(Continued)

FOREIGN PATENT DOCUMENTS

| DE | 202006014748 U1 | 2/2008 |
| DE | 202010013186 U1 | 3/2012 |

(Continued)

OTHER PUBLICATIONS

International Search Report of PCT/EP2018/076765 dated Nov. 12, 2018.
(Continued)

*Primary Examiner* — Hanh V Tran
(74) *Attorney, Agent, or Firm* — Collard & Roe, P.C.

(57) ABSTRACT

A retraction device for movable furniture parts has a driver movable along a first guide path, which is movable between a retracted position and a parked position and is directly or indirectly pretensioned into the retracted position by an energy storage device. The driver can be coupled to an activator in order to move the movable furniture part into a closed position. A method uses the driver for opening and closing the movable furniture part and tensioning and releasing a retraction device.

11 Claims, 13 Drawing Sheets

(51) Int. Cl.
*F16H 19/04* (2006.01)
*F16H 19/06* (2006.01)
*A47B 88/477* (2017.01)
*E05F 3/00* (2006.01)

(52) U.S. Cl.
CPC ..... *F16H 19/0645* (2013.01); *F16H 19/0659* (2013.01); *A47B 88/477* (2017.01); *A47B 2088/4675* (2017.01); *E05F 3/00* (2013.01); *E05Y 2201/474* (2013.01); *E05Y 2201/604* (2013.01); *E05Y 2900/20* (2013.01); *E05Y 2900/304* (2013.01); *E05Y 2900/31* (2013.01); *F16H 2019/0609* (2013.01)

(58) Field of Classification Search
CPC .... E05F 1/16; E05F 3/00; F16H 19/04; F16H 19/0645; F16H 19/0659; F16H 2019/0609; E05Y 2201/474; E05Y 2201/604; E05Y 2900/20; E05Y 2900/304; E05Y 2900/31
See application file for complete search history.

(56) References Cited

U.S. PATENT DOCUMENTS

| | | | | |
|---|---|---|---|---|
| 10,758,043 | B2* | 9/2020 | Pohlmann | A47B 88/467 |
| 11,109,676 | B2* | 9/2021 | Bantie | A47B 88/47 |
| 2006/0016279 | A1* | 1/2006 | Sato | A47B 88/467 |
| | | | | 74/89.17 |
| 2006/0017358 | A1* | 1/2006 | Sato | A47B 88/463 |
| | | | | 312/333 |
| 2006/0017359 | A1* | 1/2006 | Sato | A47B 88/467 |
| | | | | 312/333 |
| 2011/0023370 | A1* | 2/2011 | Zimmer | E05F 5/003 |
| | | | | 49/360 |
| 2011/0138579 | A1* | 6/2011 | Sato | E05F 1/16 |
| | | | | 292/164 |
| 2012/0019012 | A1* | 1/2012 | Saito | E05C 19/02 |
| | | | | 292/68 |
| 2013/0026899 | A1 | 1/2013 | Babucke-Runte et al. | |
| 2013/0088132 | A1* | 4/2013 | Hammerle | A47B 88/46 |
| | | | | 312/319.1 |
| 2013/0104339 | A1* | 5/2013 | Shimizu | E05F 1/16 |
| | | | | 16/72 |
| 2013/0134852 | A1* | 5/2013 | Salice | A47B 88/47 |
| | | | | 312/319.1 |
| 2013/0219657 | A1* | 8/2013 | Iwaki | E05F 5/003 |
| | | | | 16/64 |
| 2014/0026357 | A1* | 1/2014 | Zimmer | E05F 1/16 |
| | | | | 16/72 |
| 2017/0265644 | A1* | 9/2017 | Fischer | F16C 29/005 |
| 2018/0371815 | A1* | 12/2018 | Intelmann | E05F 3/02 |
| 2020/0190882 | A1* | 6/2020 | Bantle | E05F 5/06 |

FOREIGN PATENT DOCUMENTS

| | | |
|---|---|---|
| DE | 202011104526 U1 | 11/2012 |
| DE | 202012008995 U1 | 1/2014 |
| DE | 102013100652 A1 | 7/2014 |
| DE | 102014106796 A1 | 11/2015 |
| EP | 1988003 A2 | 11/2008 |
| EP | 2 710 924 A1 | 3/2014 |
| RU | 2 506 872 C2 | 2/2014 |
| RU | 2 527 183 C2 | 8/2014 |

OTHER PUBLICATIONS

German Search Report dated Oct. 1, 2018 issued in the corresponding German Application DE 10 2017 123 613.9 (with English translation of relevant parts).
Indian Examination Report dated Mar. 9, 2022 in Indian Application No. 202047019260.

* cited by examiner

RETRACTION DEVICE AND METHOD FOR OPENING AND CLOSING A MOVABLE FURNITURE PART

CROSS REFERENCE TO RELATED APPLICATIONS

This application is the National Stage of PCT/EP2018/076765 filed on Oct. 2, 2018, which claims priority under 35 U.S.C. § 119 of German Application No. 10 2017 123 613.9 filed on Oct. 11, 2017, the disclosures of which are incorporated by reference. The international application under PCT article 21(2) was not published in English.

BACKGROUND OF THE INVENTION

The present invention relates to a retraction device for movable furniture parts, having a driver movable along a first guide path, which is movable between a retracted position and a parked position and is directly or indirectly pretensioned into the retracted position by an energy storage device, wherein the driver can be coupled to an activator in order to move the movable furniture part into a closed position, and a method for opening and closing a movable furniture part and tensioning and releasing a retraction device.

DE 20 2006 014 748 U1 discloses a device for retracting a movable furniture part, in which the movable furniture part can be retracted into a closed position on the furniture body via an energy storage device, and the energy storage device can be loaded by moving the movable furniture part out of the closed position. Transmission means are provided, by means of which, in the assembled state of the device, a force to be applied to move the movable furniture part from the closed position to an open position is less than the force provided by the energy storage device in the retraction direction of the movable furniture part. For the transmission mechanism, pinions and tooth profiles are used to ensure appropriate power transmission.

In addition, self-closing devices are known, as they are disclosed for example in DE 10 2014 106 796. A retracting arrangement comprises a retracting spring and a second pretensioned retracting element which applies an additional retraction force from an intermediate position located between the parked position and the retracting position. This should make the opening and closing process more comfortable. If several springs are used, the retraction force can be increased in the area just before the retracted position, but the problem with the opening process is that the spring force increases when opening and when the movable furniture part is uncoupled from one of the springs, a sudden reduction in force occurs, which is perceived as unpleasant by the user.

SUMMARY OF THE INVENTION

It is therefore the object of the present invention to create a retraction device for movable furniture parts which has an improved handling. In addition, a method for opening and closing a movable furniture part should result in gentle tensioning and release of the retraction device.

This object is solved with a retraction device having a driver which can be moved along a first guide path, can be moved between a retraction position and a parked position and is directly or indirectly pretensioned into the retraction position by an energy storage device, wherein the driver can be coupled to an activator in order to move the movable furniture part into a closed position. This object is also accomplished by a method for opening and closing a movable furniture part as described below.

In the retraction device according to the invention, the movable furniture part is coupled to a driver in the closing direction via an activator, while in the opening direction coupling takes place via an opening activator and an opening driver. The opening driver is coupled to the driver via a transmission gear, which pulls the driver from a retracted position to the parked position during an opening movement, wherein the distance traveled by the opening driver is longer than that of the driver. As a result, high retraction forces can be provided over a comparatively short distance during a closing movement, while only lower forces have to be overcome during an opening movement over a correspondingly longer distance, which simplifies handling. The transmission gear allows for optimized handling when opening and closing the movable furniture part.

Preferably, the transmission gear is a gear with a transmission ratio that can be changed by the movement of the opening driver. If the opening driver moves constantly in the opening direction, for example, the movement of the driver from the retracted position to the parked position can be slower. This makes it possible to reduce the force required for opening, unlike with tension springs, by reducing the movement of the driver before reaching the parked position. Due to the changing transmission ratio, the movement of the driver relative to the opening driver may be at least 50% slower and may be further reduced, especially just before reaching the parked position. As a result, the user will hardly feel the placement of the opening driver and the driver in a parked position, as only small forces need to be overcome when the driver is placed in the parked position.

In another embodiment, the second guide path has a linear section and an angled section that forms a parking section for the opening driver. If the opening driver is arranged in the angled section, preferably the opening activator and the opening driver are decoupled from each other, and in addition the driver is arranged in the parked position. This allows the movable furniture part to move freely when the driver and the opening driver are placed in a parked position.

While during an opening process the movable furniture part is coupled to the retraction device via the opening activator, during a closing movement the activator, which is located at a distance from the opening activator, is coupled to the driver. This results in different force and movement sequences during opening and closing.

Preferably, the transmission gear is equipped with at least one cable pull that can be wound up along a rotating pulley. In order to obtain a flexible transmission ratio, at least one winding edge for a cable pull can be formed on the pulley, which has a radius that changes in relation to the axis of rotation of the pulley. Preferably, winding edges are formed on opposite sides of the pulley, one winding edge for a cable pull for coupling the pulley with the driver and on the opposite side a winding edge for a cable pull for coupling with the opening driver.

However, it is also possible to use a transmission gear based on racks and non-circular gears, wherein the teeth are arranged along a curve which is at a non-constant distance from the axis of rotation of the gear, thus varying the ratio of angular velocity to the linear velocity of the rack. Such a progressive gear is shown for example in EP 1 988 003 A2. The use of such a progressive gear preferably with gear parts made of plastic is particularly advantageous for dishwashers, as aggressive media are present there. Here, too, the transmission ratio can change over the distance.

The retraction device according to the invention is preferably used for pull-out guides which pretension drawers for furniture or drawer elements for household appliances, such as wire baskets, support shelves, plastic containers in a retracted position. The two guide paths can preferably be arranged in a stationary position, while the opening activator and the activator are fixed to a movable rail of the pull-out guide or to the drawer or storage element, resulting in a compact design. In the further description, only the movable furniture part is mentioned, but the explanations apply analogously to rail-guided drawer elements in household appliances.

In the method in accordance with the invention for opening and closing a movable furniture part and for tensioning and releasing a retraction device, the movable furniture part is first moved from the closed position in the opening direction, wherein an opening driver moves a driver in the opening direction via a transmission gear, which driver is pretensioned into a closed position by an energy storage device, wherein the opening driver is moved faster than the driver. The driver and the opening driver are then parked in a parked position and the movable furniture part is decoupled from the retraction device. If the movable furniture part is moved in the closing direction, an activator engages with the driver, which moves the movable furniture part and the opening activator in the closing direction via the energy storage device. In this way, opening and closing movements can be made user-friendly with regard to the distance and the forces acting during opening and closing. In addition, a damper can optionally act in the closing direction to slow down the moving furniture part before reaching the closed position.

BRIEF DESCRIPTION OF THE DRAWING FIGURES

DETAILED DESCRIPTION OF THE INVENTION

Figure 1:
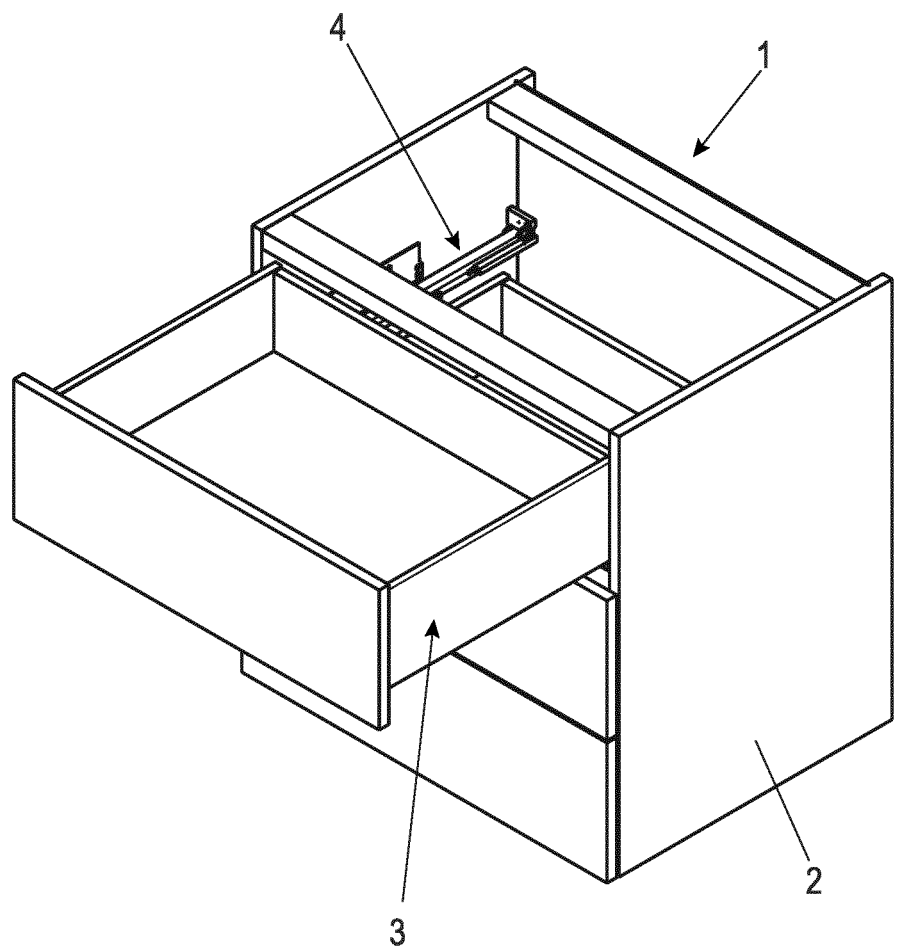
FIG. 1 shows a piece of furniture with a retraction device according to the invention.

A piece of furniture 1 comprises a furniture body 2, on which several drawer elements 3 are movably mounted in the form of drawers. For this purpose, pull-out guides 4 are fixed to the furniture body 2, which allow the drawer elements 3 to be moved from a closed position in the opening direction and back again. Instead of a piece of furniture 1, a drawer element 3 can also be attached to a household appliance, such as a dishwasher or refrigerator.

Figure 2:
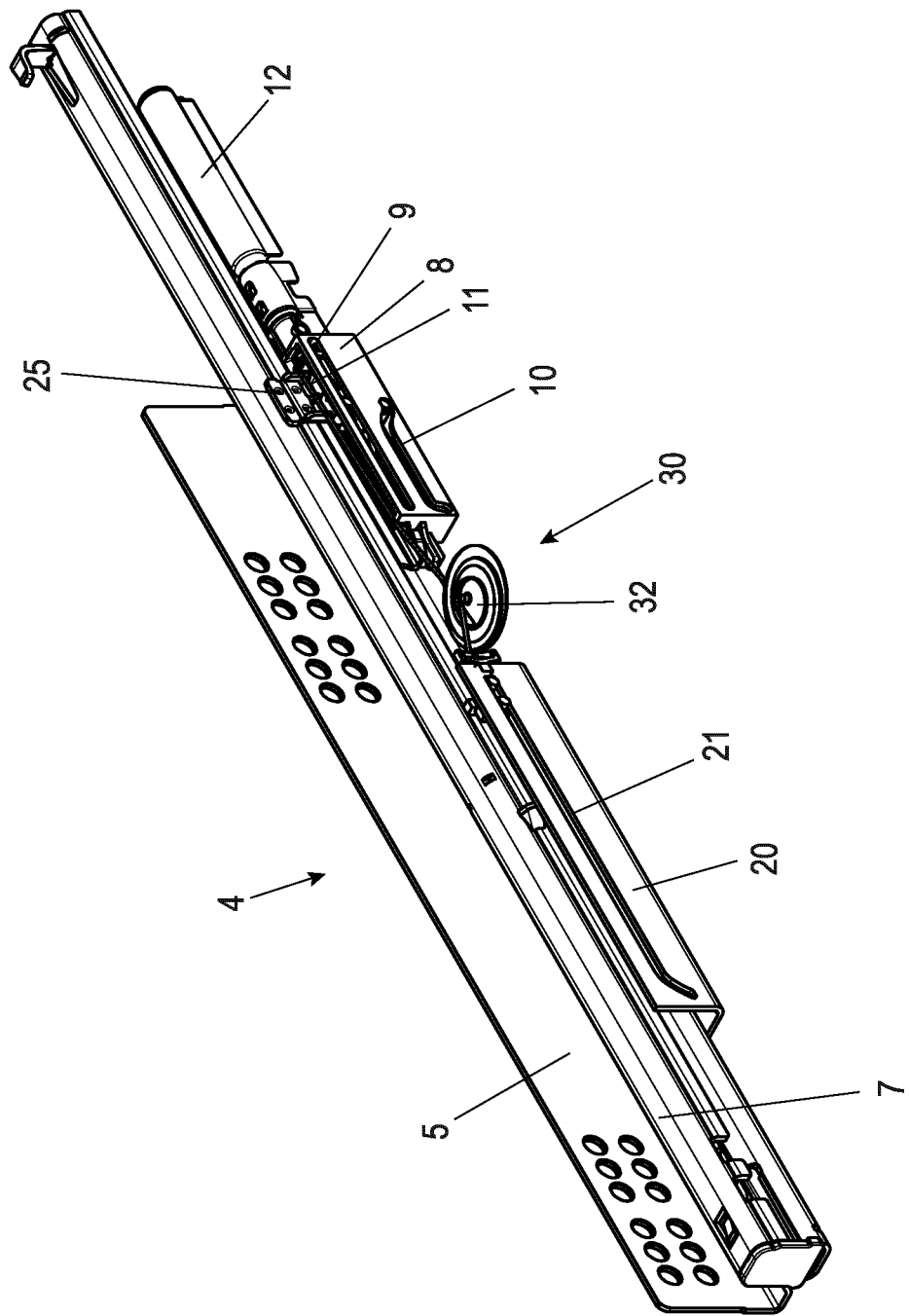
FIG. 2 shows a pull-out guide with a retraction device according to the invention.

FIG. 2 shows a pull-out guide 4 with a retraction device. The pull-out guide 4 comprises a stationary guide rail 5 which can be fixed to the furniture body 2. On the guide rail 5, via the interposition of a center rail 6, a running rail 7 is displaceably mounted, to which the drawer element 3 can be fixed.

The retraction device comprises a first guide housing 8, on which two guide paths 9 and 10 are formed to guide a driver 11. The driver 11 can be coupled over a certain distance to an activator 25, which is fixed to the running rail 7. Furthermore, the retraction device comprises a second guide housing 20, on which a second guide path 21 is formed.

The driver 11 is pretensioned to a closed position by an energy storage device, wherein the energy storage device is located in a cartridge 12. A damper, in particular a linear damper, may also be provided in cartridge 12 to slow down a closing movement of the movable furniture part and the driver 11 before reaching the closed position. The closed position of the drawer element 3 corresponds to the retracted position of the driver 11, which can be moved between the retracted position and a parked position.

Figure 3:
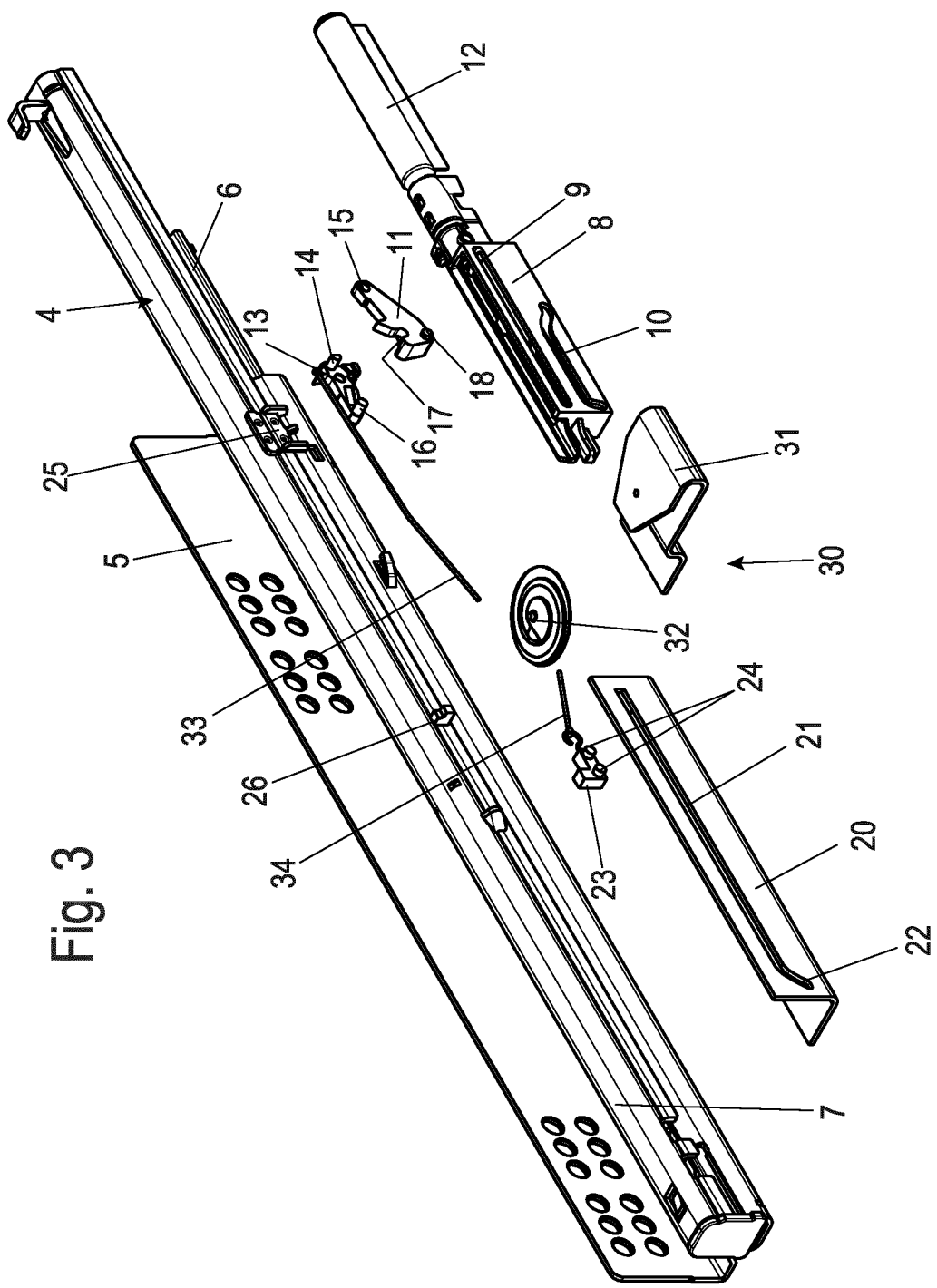
FIG. 3 shows a perspective exploded view of a retraction device according to the invention.

FIG. 3 shows the retraction device in detail. The driver 11 is connected to a connecting piece 13, to which one end of a cable pull 33 is fixed. The connecting piece 13 and the driver 11 can be moved together on the first guide housing 8. A pin 14 of the connecting piece 13 passes through an opening 15 on the driver 11 and is guided in the upper guide path 9. In addition, a further pin 16 is arranged on the connecting piece 13 in the linear guide path 9, so that the connecting piece 13 can only be moved linearly along the guide path 9.

A receptacle 17 is formed on the driver 11, into which the pin 16 of the connecting piece 13 can be inserted. Furthermore, the driver 11 can be moved with a protruding pin 18 in a second guide path 10 on the first guide housing 8. The second guide path 10 comprises an angled end section on the front side, as seen in the opening direction, at which the driver 11 can be pivoted and latched into the cartridge 12 against the force of an energy storage device. The driver 11 can thus be moved between the parked position with tensioned energy storage device and a retraction position with largely relaxed energy storage device.

On the second guide housing 20 with the second guide path 21, an opening driver 23 can be moved, which is movably held in guide path 21 via two spaced pins 24. The guide path 21 comprises an angled end section 22 on the front side in the opening direction, on which the opening driver 23 can be pivoted in order to decouple a coupling between an opening activator 26 on the running rail 7 and the opening driver 23. The opening driver 23 can also be moved between a retracted position and a parked position.

The driver 11 and the opening driver 23 are connected to each other via a transmission gear 30. The transmission gear 30 comprises a rotatably mounted disc 32, which is arranged stationary on a holder 31, wherein the holder 31 is fixed, for example, to the guide rail 5. The rotatable disc 32 has winding edges on opposite sides, and when the disc 32 rotates, a cable pull 33 or 34 can be wound up or unwound. The winding edges have a different radius to the axis of rotation, so that the speed when winding or unwinding the two cable pulls 33 or 34 is different. Optionally, at least one winding edge or core for winding one of the cable pulls 33 or 34 can also have a constant diameter. Disc 32 can be turned several times, for example by 1.5 to four turns, to wind up the cable pulls 33 and 34.

Figure 4A:
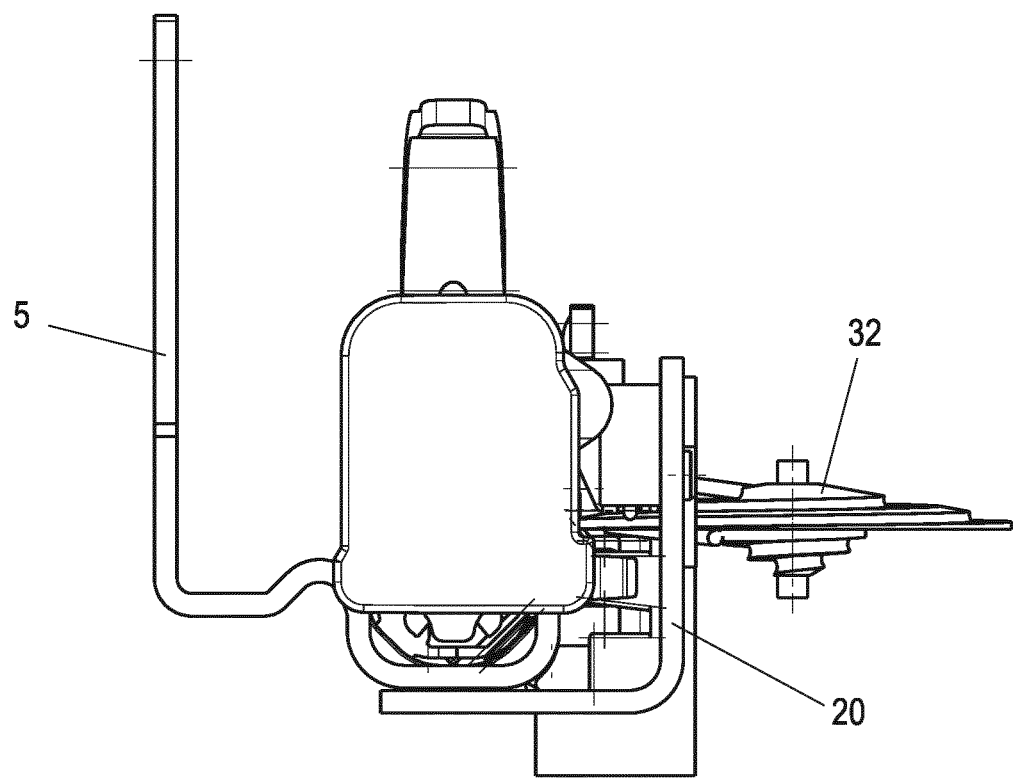
FIG. 4A shows a front view of the retraction device of FIG. 2.
Figure 4B:
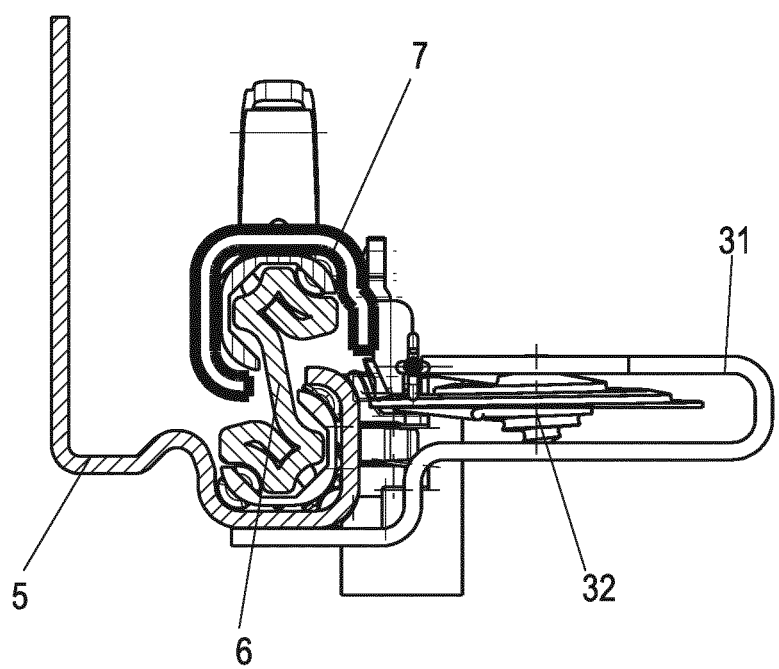
FIG. 4B shows a sectional view of FIG. 4A.

FIG. 4A shows a front view of the pull-out guide and shows that the second guide housing 20 is formed in an angled manner and is attached to the guide rail 5 at an underside. The sectional view in FIG. 4B shows the area of pulley attachment. The disc 32 has a vertical axis of rotation, although other orientations of the disc 32 are also possible. The disc 32 is fixed to a U-shaped holder 31, which is also fixed to the guide rail 5. The first guide housing 8 can also be fixed to the guide rail 5.

Figure 5A:
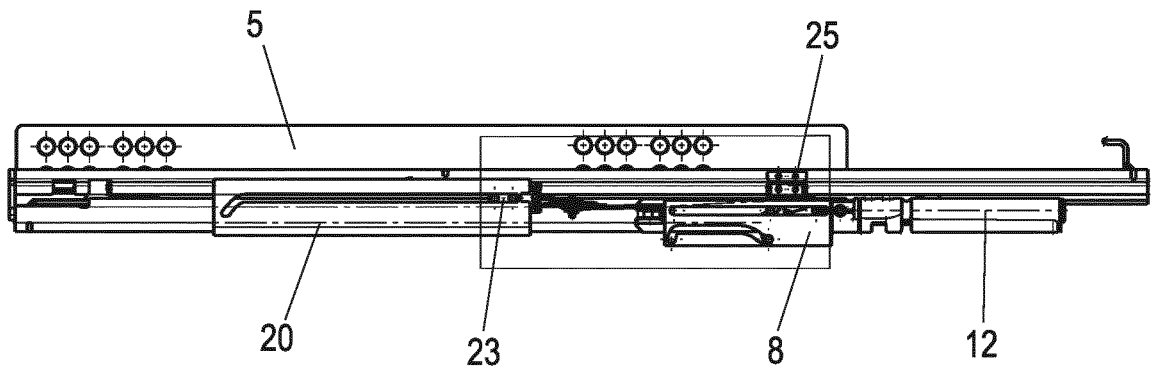
FIGS. 5A and 5B show two views of the retraction device of FIG. 2 in a closed position.
Figure 5B:
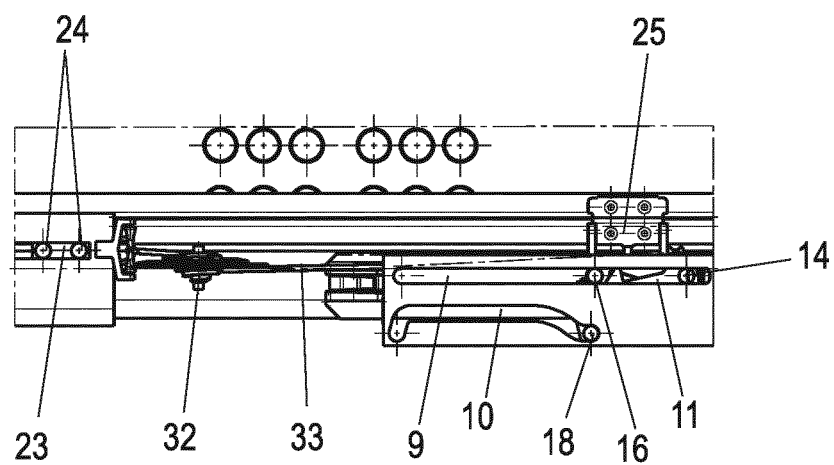

FIGS. 5A and 5B show the retraction device in a closed position for the movable furniture part and in a retracted position for the driver 11. The driver 11 can only be loaded in closing direction via the activator 25, while the activator 25 is freely movable relative to the driver 11 in opening direction. In the retracted position, the driver 11 is in a pivoted position in which a front side in the opening direction has been moved away from the activator 25, because the pin 18 has lowered along the guide path 10 during a closing movement, thereby decoupling the activator 25 in the opening direction. The opening driver 23 is coupled to the opening activator 26, i.e. a contact surface of the opening driver 23 is in contact with the opening activator 26 and pulls it in closing direction, wherein the opening driver 23 is coupled via the transmission gear 30 and the driver 11 to the energy storage device in the cartridge 12.

Figure 6:
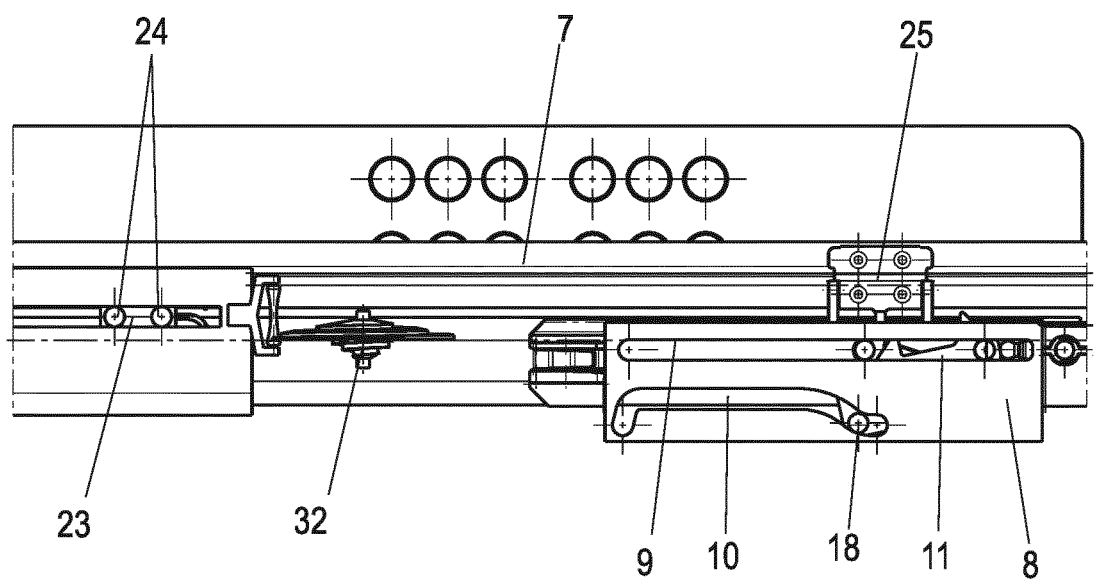
FIGS. 6 to 9 show multiple views of the retraction device during an opening movement of the pull-out guide.

If the movable furniture part is now moved in the opening direction, for example by a pulling movement on the drawer, the opening activator 26 pulls on the opening driver 23, which turns the rotatable disc 32 via the transmission gear 30 and also moves the driver 11 slightly in the opening direction. Due to the transmission gear 30, the opening driver 23 moves a greater distance than the driver 11, as shown in the comparison of FIGS. 5B and 6. The activator 25 moves at the same speed as the opening activator 26, as both are fixed to the running rail 7.

Figure 7:
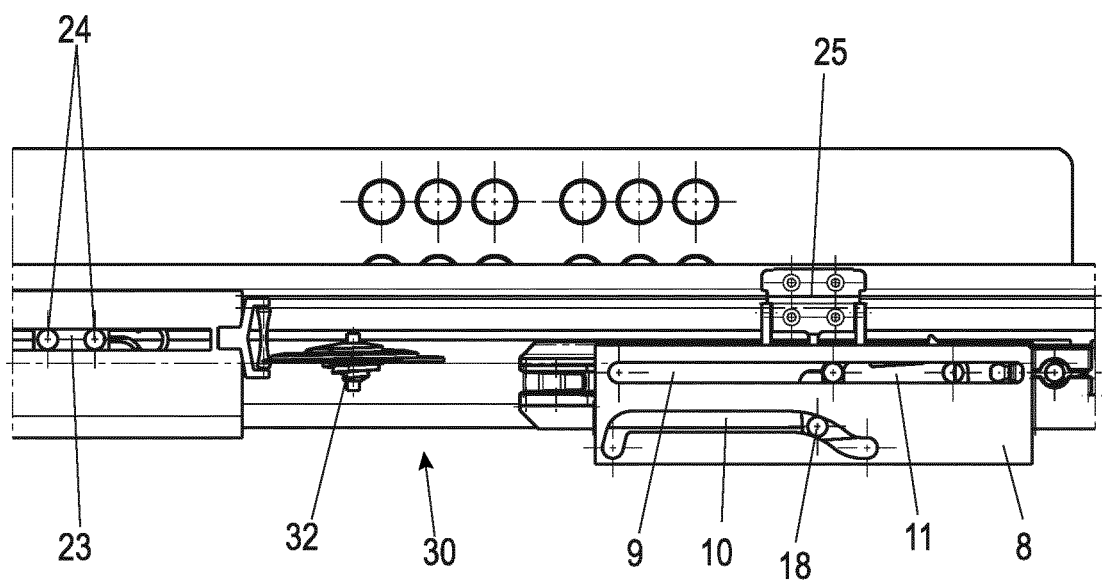

The driver 11 is moved along the two guide paths 9 and 10, wherein the driver 11 is pivoted after a short starting phase, as shown in the comparison of FIGS. 6 and 7. The pivoting movement is achieved in such a way that the pin 18 in the guide path 10 moves towards the activator 25, but at a position where the activator 25 is already located adjacent to the driver 11, and thus no more engagement between the activator 25 and the driver 11 is made. The movement of the carrier 11 is due to a pulling movement by the opening driver 23, which is moved in opening direction by the opening activator 26. Via the transmission gear 30, the opening driver 23 is moved faster in opening direction than the driver 11.

Figure 8:
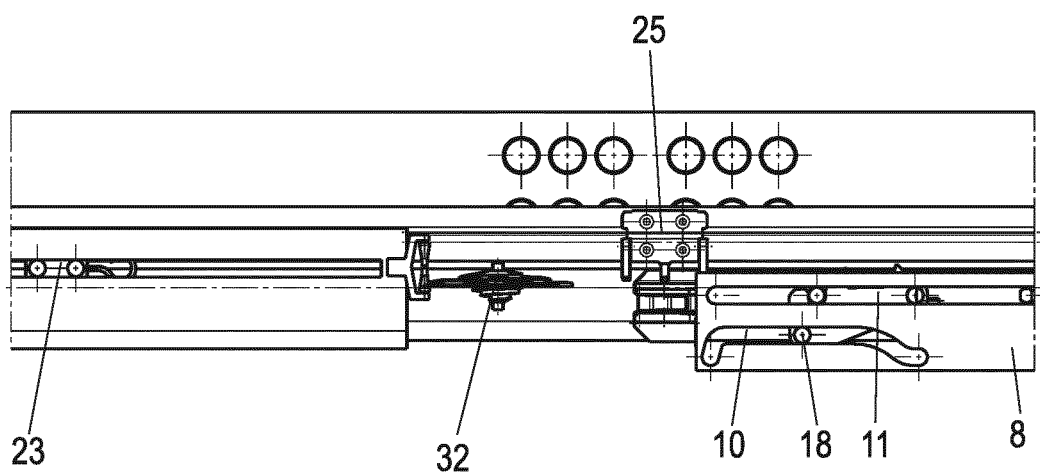

In FIG. 8, the opening driver 23 has been moved over a much longer distance than the driver 11, which is more than twice as long, for example. As a result, the forces required to overcome the energy storage device acting on the driver 11 during opening are correspondingly lower.

Figure 9:
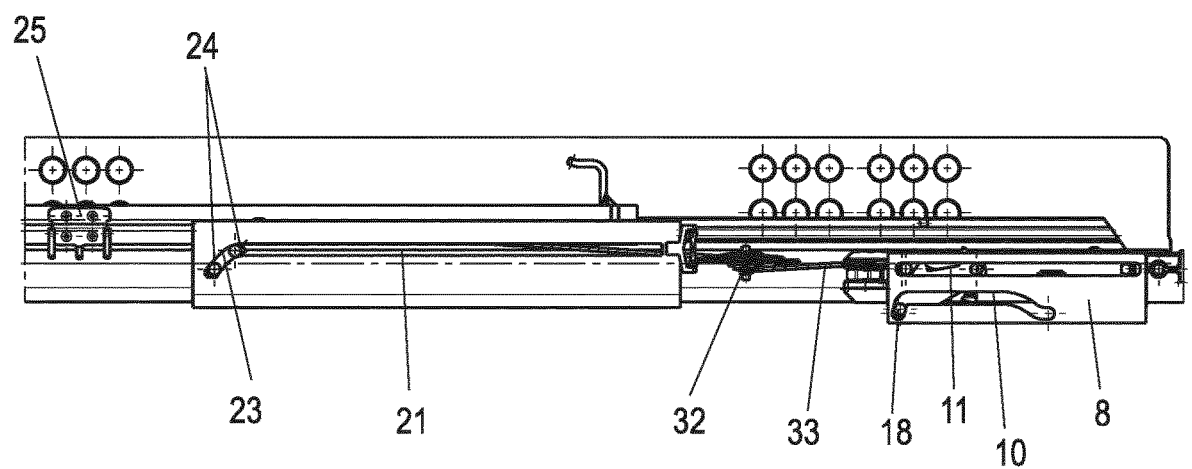

In FIG. 9 the opening driver 23 has been moved to a parked position where the opening driver 23 is located at the angled end section 22. This causes the opening driver 23 to pivot and decouples a connection with the opening activator 26, which is then freely movable in the opening direction. In the parked position of the opening driver 23 at the angled end section 22, the driver 11 has also arrived at the same time in the parked position in which the pin 18 is located at the angled end section of the guide path 10. The driver 11 is latched in the parked position with tensioned energy storage device by the energy storage device in the cartridge 12. The energy storage device can be designed as a compression or tension spring or as another spring element.

If the movable furniture part is now moved in the closing direction, the opening activator 26 can be moved past the opening driver 23, as this is still in the parked position and thus allows the opening activator 26 to be passed. The movable furniture part and the running rail 7 can be moved in closing direction until the activator 25 engages with the pivoted driver 11, which moves and pivots it out of the parked position, so that now the driver 11 is moved together with the activator 25. The coupling of the activator 25 enables the running rail 7 to be braked via a damper in the cartridge 12 to avoid loud impact noises. When the driver 11 is moved in the closing direction, the opening driver 23 is simultaneously moved from the parked position at the angled end section 22, which is now also moved in the closing direction. The driver 11 pulls the opening driver 23 via the transmission gear 30, which again moves at a higher speed in closing direction, but this does not affect the closing forces, as the opening activator 26 is still at a distance from the opening driver 23. Only shortly before reaching the closed position, the driver 11 is pivoted, and by pivoting, the activator 25 is released again in the opening direction, as shown in FIG. 6. In this position the opening driver 23 can engage with the opening activator 26 and then pull the running rail 7 the last distance to the closed and retracting position shown in FIGS. 5A and 5B.

Figure 10A:
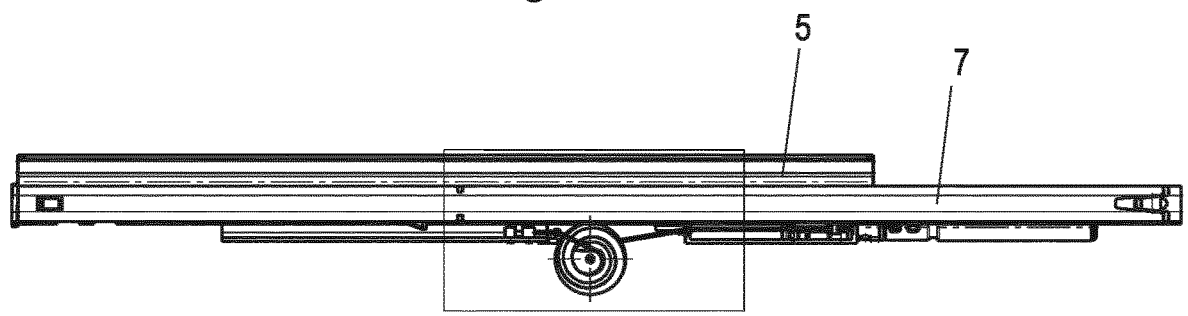
FIGS. 10A and 10B show two views of the retraction device in a top view.
Figure 10B:
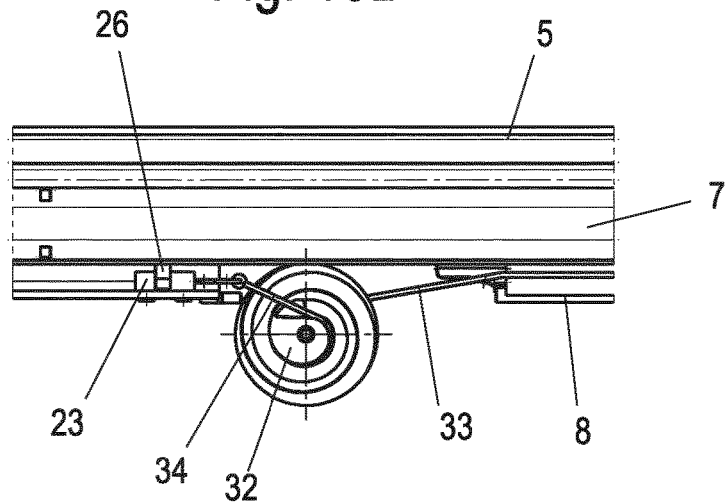

FIGS. 10A and 10B show a top view of the rotatable disc 32 of the transmission gear 30. It can be seen that the cable pull 34, which couples the opening driver 23 to the rotatably mounted disc 32, can be wound and unwound on a winding edge which has a changing radius in relation to the axis of rotation.

Figure 11A:
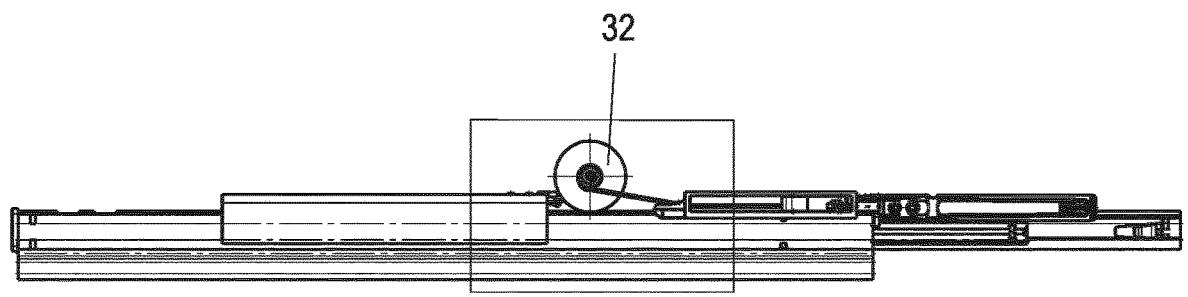
FIGS. 11A and 11B show two views of the retraction device in a bottom view.
Figure 11B:
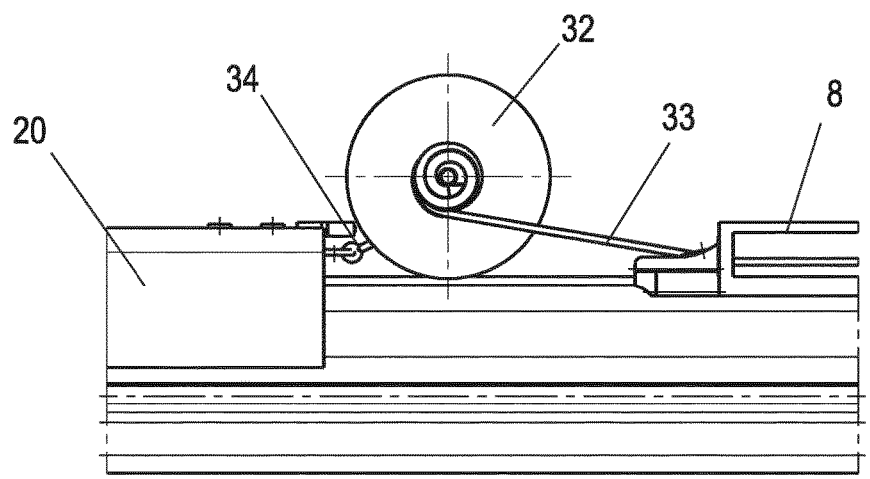

FIGS. 11A and 11B show an underside of pulley 32, on which a winding edge is also formed to wind and unwind the cable pull 33, which creates a connection between the rotatable disc 32 and the driver 11. The winding edges have different radii and can therefore provide different transmission ratios, which can also change over the travel of the driver 11 and the opening driver 23.

Figure 12:
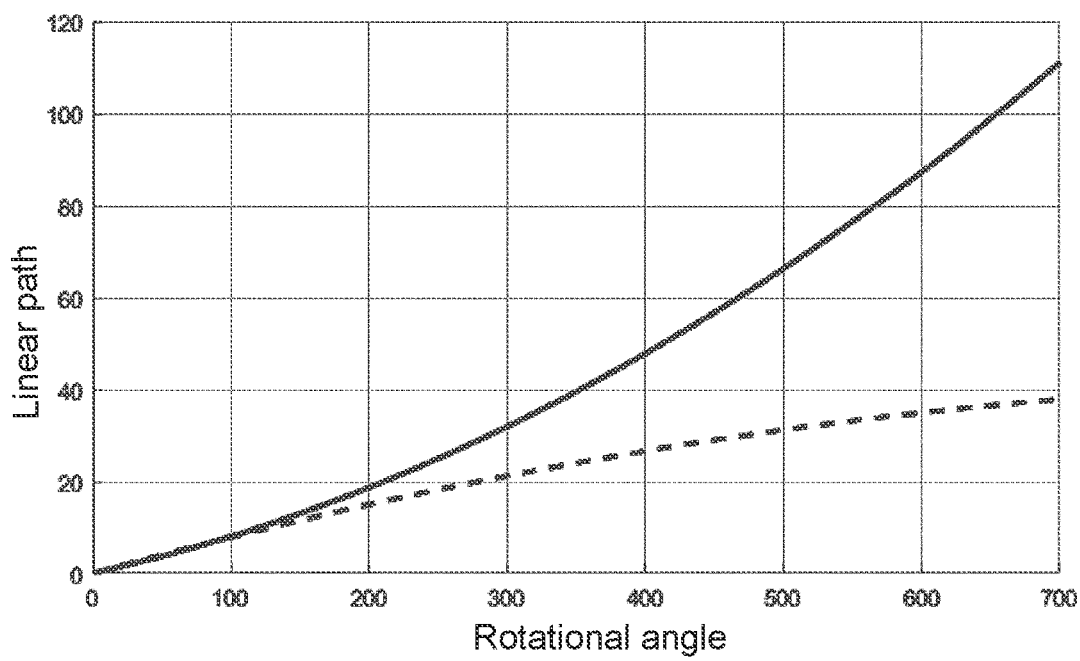
FIG. 12 shows a diagram showing the linear travel of the cable pulls relative to the angle of rotation of a pulley of the transmission gear.

FIG. 12 shows a diagram of a possible transmission ratio between an angle of rotation of disc 32 and the two cable pulls 33 and 34, which cover a linear path. The dotted line represents the cable pull 33, which is wound up or unwound essentially in proportion to the angle of rotation. The solid line represents the ratio between the angle of rotation of the disc and the cable pull 34. As can be seen, the linear travel of the cable pull increases significantly towards the end of the rotation angle, i.e. at constant rotation angle speed the speed of cable pull 34 increases. At the same time, the forces required to tension the energy storage device are reduced.

Figure 13:
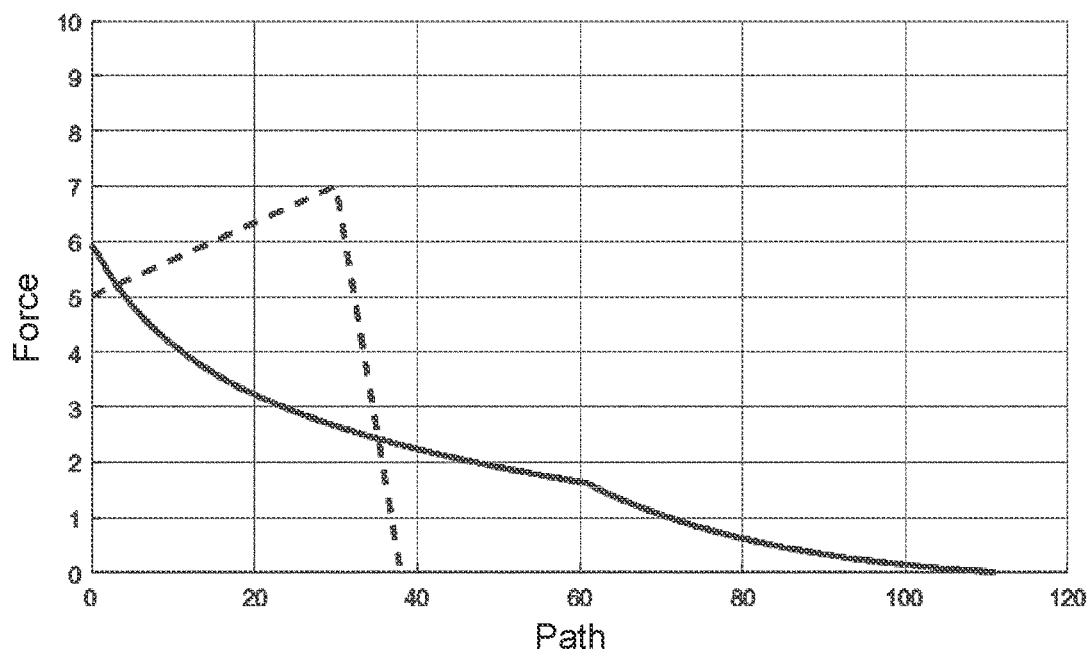
FIG. 13 shows a force-displacement diagram to illustrate the opening and closing movement.

FIG. 13 therefore shows the forces acting on the running rails 7 during opening and closing. During an opening movement, the opening force is reduced by the transmission gear in accordance with the solid line, wherein the distance travelled to tension the retraction device is more than twice the distance travelled to close the retraction device. The length of the tensioning process of the retraction device, for example, is in a range between 8 cm to 14 cm, in particular 9 cm to 12 cm. The length of the distance when the drawer element 3 is pulled into the closed position is preferably between 2 cm and 6 cm.

During a closing operation, the retracting device only becomes effective when a distance of about 30 to 50 mm before the closed position is reached, as shown by the dashed line. The retraction device is first activated by unlocking the driver 11 from the parked position. As soon as a corresponding unlocking has taken place, activator 25 is pulled in the retraction direction, wherein the force in the retraction direction decreases, since the energy storage device relaxes slightly when moving in the closing direction. The selected transmission ratios for opening and closing can, of course, be modified by a person skilled in the art.

Both the length of the tensioning process and the length of the retraction distance when closing can be changed. The transmission ratio can also be adjusted, wherein, if possible, the user no longer feels any abrupt jumps in force when opening the movable furniture part.

LIST OF REFERENCE NUMERALS

1 Furniture
2 Furniture body
3 Drawer element
4 Pull-out guide
5 Guide rail
6 Center rail
7 Running rail
8 Guide housing
9 Guide path
10 Guide path
11 Driver
12 Cartridge
13 Connecting piece
14 Pin
15 Opening
16 Pin
17 Receptacle
18 Pin
20 Guide housing
21 Guide path
22 End section
23 Opening driver
24 Pin
25 Activator
26 Opening activator
30 Transmission gear
31 Holder
32 Disc
33 Cable pull
34 Cable pull

What is claimed is:

1. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein the transmission gear (30) is a gear with a transmission ratio which can be varied via the movement of the opening driver (23).

2. The retraction device according to claim 1, A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein with a constant movement of the opening driver (23) in the opening direction, the movement of the driver (11) from the retraction position to the parked position becomes slower.

3. The retraction device according to claim 2, wherein with constant movement of the opening driver (23) in the opening direction, the movement of the driver (11) from the retracted position to the parked position is slowed down by at least 50% due to a changing transmission ratio.

4. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein the second guide path (21) has a linear section and an angled section and, when the opening driver (23) is arranged on the angled section, the opening activator (26) is decoupled from the opening driver (23) and the driver (11) is arranged in the parked position.

5. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein the transmission gear (30) comprises at least one cable pull (33, 34) which is configured to be wound up along a rotatable disc (32), wherein a winding edge for the cable pull (33, 34) is formed on the disc (32), said winding edge having a radius which varies relative to an axis of rotation of the disc.

6. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein the transmission gear (30) comprises at least one rack which runs along at least one non-circular gear, and wherein the at least one non-circular gear has teeth that are arranged along a curve which extends at a non-constant distance from an axis of rotation of the non-circular bear.

7. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein during a closing movement of the movable furniture part (3), the activator (25) moves the driver (11) out of the parked position and the driver (11) moves the activator (25) into the retracted position by a force of the energy storage device.

8. A retraction device for movable furniture parts (3), comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein the activator (25) in the retraction position is freely movable in the opening direction relative to the driver (11).

9. A pull-out guide (4) having at least two rails (5, 6, 7) movable relative to one another and with a retraction device for a movable furniture part, the retraction device comprising a driver (11) which is configured to be moved along a first guide path (10) between a retraction position and a parked position and is directly or indirectly pretensioned into the retraction position by an energy storage device, wherein the driver (11) is configured to be coupled to an activator (25) in order to move the movable furniture part (3) into a closed position, and further comprising an opening driver (23) which is movable along a second guide path (21) and is coupled to the driver (11) via a transmission gear (30), wherein the opening driver (23) is configured to be coupled to an opening activator (26) which moves the opening driver (23) along the second guide path (21) in an opening direction during an opening movement, wherein a distance traveled by the opening driver (23) is longer than a distance traveled by the driver (11), wherein during a closing movement of the movable furniture part (3), the activator (25) moves the driver (11) out of the parked position and the driver (11) moves the activator (25) into the retracted position by a force of the energy storage device.

10. The pull-out guide according to claim 9, wherein the two guide paths (10, 21) are arranged in a stationary manner and the opening activator (26) and the activator (25) are fixed to the movable rail (5, 6, 7) of the pull-out guide (4) or to the movable furniture part (3).

11. A method for opening and closing a movable furniture part (3) and for clamping a retraction device, comprising the following steps:
   moving the movable furniture part (3) from a closed position in an opening direction, wherein an opening driver (23) moves a driver (11) in the opening direction via a transmission gear (30), the driver (11) being pretensioned in a closing direction by an energy storage device, wherein the opening driver (23) is moved faster than the driver (11);
   parking the driver (11) and the opening driver (23) in a parked position and decoupling the movable furniture part (3) from the retraction device, and moving the movable furniture part (3) in the closing direction, wherein an activator (25) is coupled to the driver (11), which via the energy storage device moves the movable furniture part (3) and the opening activator (26) in the closing direction, wherein when the opening driver (26) is moved at constant speed from the retracted position to the parked position, the speed of the driver (11) is reduced.

* * * * *